Nov. 26, 1963 R. K. NOLTE Re. 25,486
METHOD OF AND APPARATUS FOR RINSING AND DRYING METAL PANS
Original Filed Aug. 15, 1961
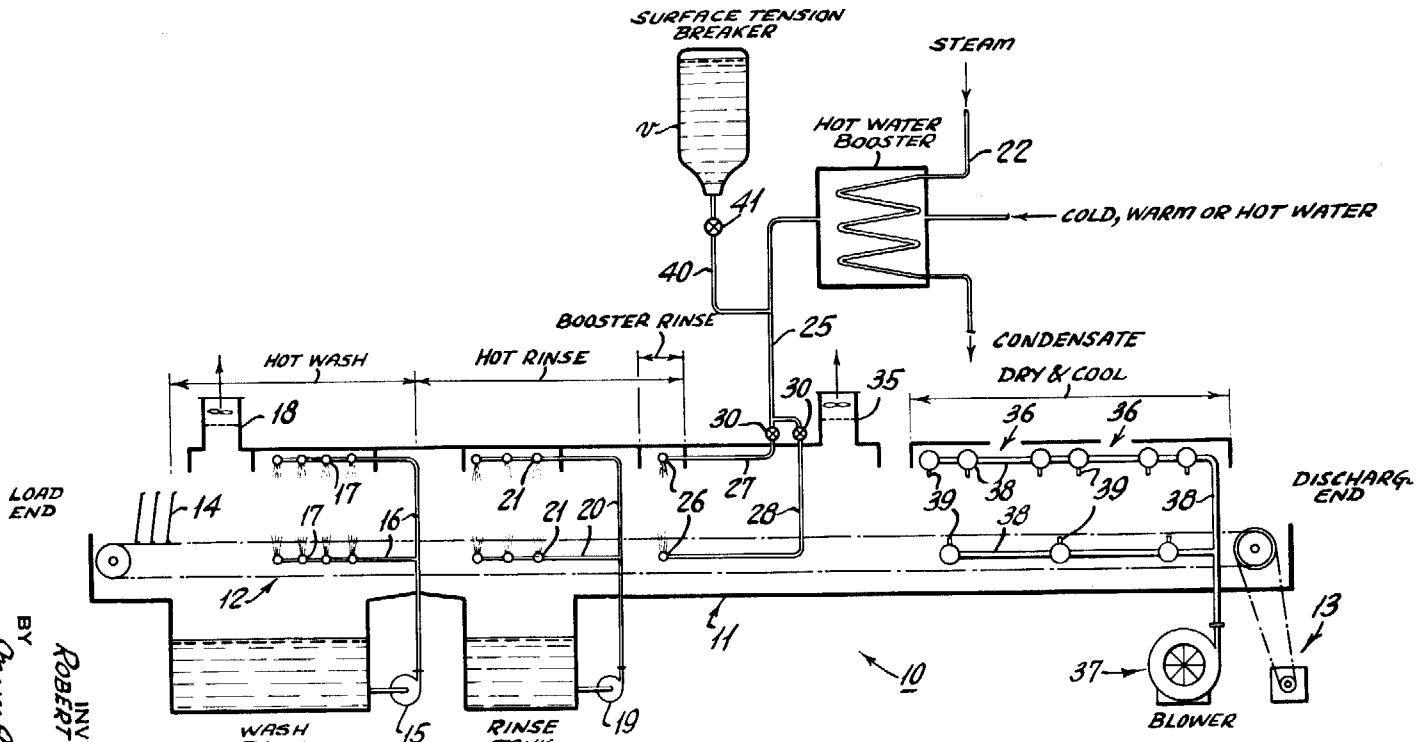
INVENTOR
ROBERT K. NOLTE
BY
Moses, Nolte & Nolte
ATTORNEYS United States Patent Office Re. 25,486
Reissued Nov. 26, 1963

25,486

METHOD OF AND APPARATUS FOR RINSING AND DRYING METAL PANS

Robert K. Nolte, Chatham, N.J., assignor, by mesne assignments, to Metalwash Machinery Corporation, Elizabeth, N.J., a corporation of New Jersey Original No. 3,076,730, dated Feb. 5, 1963, Ser. No. 131,619, Aug. 15, 1961. Application for reissue Apr. 25, 1963, Ser. No. 276,144
17 Claims. (Cl. 134—25)

Matter enclosed in heavy brackets [ ] appears in the original patent but forms no part of this reissue specification; matter printed in italics indicates the additions made by reissue.

The present invention relates to pan washing methods and machinery and is particularly adapted for processing large quantities of metal pans wherein the pans are washed, rinsed, dried, and cooled.

Prior art or standard type machinery for washing, rinsing, drying and cooling metal bakery pans, for instance, are characterized by their extreme lengths and by the fact that they are very expensive. The lengthiness of these machines is due to the fact that wet pans coming from the final rinse section of the machine must travel through a hot air drying section, at the end of which the then dry pans must be conveyed through a relatively lengthy cooling section operated by non-heated air in order to cool the pans down from the temperature to which they are raised in the heated section. This cooling operation is important in bakery pan processing because when pan grease is applied for the next baking operation the grease will not *after application to the pan surface* become liquid, run and/or drip but will adhere to a relatively cool pan surface in a semi-solid state.

Many bakery firms cannot use such machines due to the lack of space required for such an installation. Sometimes bakery firms utilize machines without the final cooling section as above described and in such cases the hot pans discharging from the heated section must be stored until cooled. This is objectionable in that a great deal of time is wasted waiting for the pans to cool and the storing and retrieving activities create wasted man-hours of work.

It is an object of the present invention to obviate these problems of the prior art pan washing machinery.

More specifically, it is an object of the invention to dry and cool bakery pans simultaneously within a single end section of a pan washing machine.

In accordance with the invention, wet pans emerging from a hot rinse section of a processing machine are dried and cooled simultaneously in a single section of the machine by blowing non-heated air over them. By the term "non-heated air" as used herein is meant air at a temperature substantially less than the temperature of the hot air used in the drying section of the prior art machines, as, for example, room temperature air or outdoor temperature air. The forced non-heated air "sheets off" practically all of the hot rinse water adhering to the pans as they come from the hot rinse section leaving the pans with a thin hot film which readily evaporates under the influence of the non-heated air blowing over them. The forced air reduces the temperature of the pans as they are dried and the evaporation process assists in cooling the pans to a temperature below that of the forced non-heated air, a result not achievable in the prior art machines because the cooling sections processed only pans that had already been dried.

As a result of the elimination of the heater section of the prior art machines, the cooler-dryer section of the invention may be shorter than even the cooling section of the prior art machines. This is because the pans are not raised to the high temperature required in prior art machines where drying has been accomplished by forced heated air.

To increase the efficiency of the process of the invention and of a machine incorporating the invention, a booster rinse at the final rinse section of the machine is provided. This booster rinse increases the temperature of the rinse water and of the pans emerging from the rinse section and hastens the evaporation of the thin film of hot water on the pans as they are conveyed through the dryer-cooler section of the machine.

Further advantages and objects of the invention will be understood upon a reading of the following detailed specification of a specific embodiment thereof with reference to the drawing which shows a longitudinal sectional view of a diagrammatic representation of a bakery pan washing machine incorporating the present invention.

In the drawings a pan washing machine 10 in accordance with the invention is shown. It comprises a frame 11 extending from the load end thereof to the discharge end and supporting an endless pan conveyor 12 for movement longitudinally therethrough via conventional drive means 13. The conveyor 12 may be of a construction similar to that shown and described in applicant's copending United States application Serial No. 111,941, filed May 23, 1961, now abandoned in favor of applicant's continuing application Serial No. 186,828, filed April 6, 1962 so that the pans 14 may be conveyed in uniform longitudinal spaced relation in a near vertical posture and inclined with respect to the horizontal and to the vertical for permitting optimum drainage from the pans.

A wash tank underlies the tunnel shaped hot wash section of the machine and supplies a recirculating hot washing solution via a pump 15 and pump discharge piping means 16 through the multiple spray manifold units 17 disposed above and below the path of travel of the pans 14. A vent exhaust 18 is provided at the entry end of the machine to prevent a build-up of hot vapor from emitting from the machine and protects the operator. After washing in the hot wash section, the pans 14 are conveyed via the conveyor 12 into the tunnel shaped hot rinse section of the machine which includes a rinse tank underlying the path of the pans 14 and from which hot water is recirculated via pump 19 and pump discharge piping means 20 through the multiple spray manifold units 21, disposed above and below the path of travel of the pans.

At the end portion of the hot rinse section there is provided a booster rinse area wherein hot water of a very high temperature (above 180° F.) is sprayed on the pans 14 for a very short period of time.

For the purpose of clarity, this area and the next adjacent venting area are shown in the drawing to be disproportionately long, relative to the whole machine. The water is "super" heated by a hot water booster, including a hot steam conduit 22 having an inlet end communicating with a coil portion and an outlet condensate end. The heat from the steam raises the tempreature of the rinse water, which may be cold, warm or hot for different applications, supplied under pressure (air pump means, for instance, not shown) to the booster rinse area through the booster via conduit 25. The water, after having its temperature raised in the booster communicates with the spray manifold units 26 above and under the path of travel of the pans in the booster rinse area via conduits 27 and 28. Valves 30 are supplied in conduits 27 and 28 for adjusting or cutting off the application of the booster rinse for various applications wherein peak drying or cooling efficiency might not be desirable. The water from spray manifold units 26 may be drained into the rinse tank by inclining the frame floor in the direction of the tank (not shown) or may be drained off via a drainage outlet, not shown.

Provision is made, in the machine shown, for introducing a wetting agent, or surface tension breaker into the "super" heated booster rinse, the vessel v containing the agent communicating with conduit 25 via conduit 40 and valve 41. The agent is used to assist in developing the very thin hot film of water on the pans 14 as they pass through the dry and cool section of the machine after the forced non-heated air sheets off the greater percentage of water, as will presently be described.

A vent exhaust 35 is provided at the end of the hot rinse section to remove any hot vapor build-up from entering the dryer-cooler section. Also, the length of space along the path of travel of the pans, taken up by the exhaust will insure that the rinse water will not splash into the dry and cool section of the machine.

As the pans 14 leave the booster rinse they enter into the dry and cool section which is an enclosed area with venting openings 36 and wherein a continuous supply of forced air at room temperature is provided throughout the length thereof, via a blower 37 communicating, via piping 38 through the lines of air nozzles 39 longitudinally spaced above and below the travel area of the pans throughout the dry and cool section. Lids, not shown, may cover the vent areas 36 and act as control valves for the activity of the forced air.

The blowing of non-heated air over the pans 14 dries them by sheeting off almost all of the hot rinse water which adheres to the pans as they enter the dry and cool section from the hot rinse section. The minutely thin hot film of water, resulting from the raising of the temperature of the water via the booster rinse, which remains on the pans, is then rapidly evaporated by the non-heated air blown over the pans 14. The evaporation cools the pans to a temperature below the temperature of the air blown over them.

The dry and cool section of the machine, thus, not only dries but also cools the pans in one operation. The cooling action is intensified because of the evaporation of the water from the pans, this being an intensification which could not be attained if the pans were conveyed through a standard type heated dryer section, as the pans passing through such a section into a cooler section would be dry and evaporative cooling is not possible.

Now it can be appreciated that a machine embodying the present invention is considerably shorter and less expensive to manufacture than similar machines of the prior art. It will be noted that the cooler section need not be as long as the cooler section of those machines where heated air is utilized to dry the pans. First, because the pans are not raised to the tmperature they would be raised to if dried by heated air, and, second, because of the cooling effect of the evaporation of the water from the pans by cool air.

Although the booster heater shown herein employs steam as a source of heat for the rinse water, it will be readily understood that other sources of heat, such as electricity or gas, may be so employed. Moreover, the specific embodiment of the present invention as described herein will readily suggest various other modifications of the structures described. Such modifications and similarly functioning constructions are contemplated by the present invention, the spirit and scope of which are defined in the following claims.

I claim:

1. In a machine for processing metal pans including means for conveying a plurality of pans along an extended area and means for hot water rinsing said pans disposed in the path of said pans along said extended area and discharging the pans in a hot and wet condition, the improvement comprising, as the next means for treating the pans, drying-cooling means for sheeting off the hot rinsed water from said pans and for evaporating water on said pans after they leave said hot water rinsing means, said drying-cooling means including [means for forcing a substantially constant temperature supply of non-heated air to impinge upon said pans, said drying-cooling means being disposed in the path of said pans along said extended area for receiving the hot and wet pans leaving said hot water rinsing means,] *tunnel means for enclosing an area lengthwise of said conveying means, means for forcing a continuous supply of air to impinge upon the pans at substantially room temperature in said tunnel means, and vent means for permitting the escape of the forced air from said area.*

2. The machine of claim 1 wherein separate heating means raises the temperature of the rinse water and of said pans as they pass through said hot water rinsing means, whereby the water on said pans along said drying-cooling means takes the form of a thin film of hot water on the pans and the evaporation thereof by the drying-cooling means is accelerated.

3. The method of processing metal pans comprising rinsing said pans with hot water, and as the next processing step drying and *evaporatively* cooling said pans simultaneously with [a] substantially constant temperature blasts of non-heated air *blown over the pans continually during substantially the entire drying and cooling processing step to cool the pans to a resultant temperature sufficiently low so that when grease is subsequently applied to the pans it will adhere to the pan surfaces.*

4. The method of claim 3 wherein the temperature of said hot water is raised just prior to the pans being dried and cooled simultaneously, the supply of non-heated air is forced to impinge upon the pans effecting a sheeting off of water from the pans, and the water on the pans is subjected to the evaporative action of the supply of non-heated air.

5. The method of claim 4, wherein a wetting agent is introduced into the hot water, the temperature of which hot water has been raised.

6. The process of treating metal pans to wet and heat them and then to simultaneously dry and cool them, which comprises wetting and heating the pans and, as the next step in said process, conveying the pans through a tunnel in approximate vertical posture and blowing air at ambient temperature from outside the tunnel into said tunnel and over the pans during their passage through the tunnel.

7. A machine for processing substantially flat bakery pans of substantially uniform dimensions and in which the pans are supported on an endless conveyor in near vertical posture, said machine comprising means for hot water rinsing said pans, a dry and cool section as the next means for treating the pans, surrounding the endless conveyor at a position for receiving the hot, wet pans from said hot water rinsing means and forming a closure underlying and overlying said conveyor, air nozzle means in said closure and along said conveyor for delivering air to discharge on the pans, and blower means for forcing a substantially constant temperature supply of non-heated air through said air nozzle means.

8. The machine of claim 7 wherein a hot water booster is provided for raising the temperature of the water and of said pans at the discharge end of said hot water rinsing means and including means for raising the rinse water to a temperature close to the boiling point and conduit and manifold supply means for delivering the heated water to discharge on the pans at the discharge end of said hot water rinsing means, said booster when operative raising the temperature of the pans above approximately 180° F., whereby a thin film of hot water remains on the pans in said dry and cool section and is subjected to the evaporative action of the non-heated air in said dry and cool section to thereby cool said pans.

9. The machine of claim 8 wherein means are provided for introducing a wetting agent onto the pans at the discharge end of said hot water rinsing means, whereby the forming of the thin film of hot water on the pans is facilitated.

10. A machine according to claim 7 including a separation area for spacing said hot water rinsing means from said dry and cool section.

11. A machine for the treatment of substantially flat bakery pans of substantially uniform dimensions to wet and heat them and then to simultaneously dry and cool them [,] *to a resultant temperature sufficiently low so that when pan grease is subsequently applied to the pans it will adhere to the pan surfaces,* comprising an endless conveyor for supporting the pans in near vertical posture, means for hot water rinsing said pans, a dry and cool section as the next means for said treatment of the pans, said dry and cool section surrounding the endless conveyor at a position for receiving the hot, wet pans from said hot water rinsing means and forming a closure [underlying and overlying] *for* said conveyor, *a plurality of* air nozzle means *longitudinally spaced* in said closure, and means for blowing air at ambient temperature through said nozzle means and over the pans in said section, said closure including means for permitting the escape of the air after it has been blown over the pans.

12. A machine for treatment of metal pans to wet and heat them and then to simultaneously dry and cool them, comprising means for wetting and heating the pans and, as the next means for said treatment of the pans, a dry and cool section [,] *extending to the exit end of the machine,* said dry and cool section including means for conveying the pans therethrough in approximate vertical posture and means for blowing air at ambient temperature from outside the dry and cool section into said section and continually over the pans during their passage therethrough *to the exit end of the machine.*

13. The process of treating metal pans to wet and heat them and then to simultaneously dry and cool them, which comprises wetting and heating the pans, and as a next step in said process conveying the pans through a tunnel and blowing air of substantially constant temperature over the pans during their passage through the tunnel, [the temperature of] the blown air being *of* substantially *room temperature,* [less than the temperature of the wetted and heated pans, until, due to evaporation,] the pans [are] *being* cooled *due to evaporation* to a final temperature less than the temperature of the blown air *to a resultant temperature sufficiently low so that when pan grease is subsequently applied to the pans it will adhere to the pan surfaces.*

14. A machine for the treatment of metal pans to wet and heat them and then to simultaneously dry and cool them, comprising means for wetting and heating the pans and, as the next means for said treatment of the pans, a dry and col section, said dry and cool section including means for conveying the pans therethrough, blower means, and nozzle means connected to said blower means for repeatedly subjecting each of the pans in its passage through said section to blasts of air from said blower means for a period of time sufficient to progressively dry and simultaneously cool said pans, the *air* blown *upon said pans* [air] being of [a] substantially room temperature [substantially less than the temperature of the wetted and heated pans].

15. A machine for the treatment of metal pans to wet and heat them and then to simultaneously dry and cool them, comprising means for wetting and heating the pans and, as the next means for said treatment of the pans, a dry and cool section, said dry and cool section including an elongated tunnel forming a closure for said section, means for conveying the pans through said tunnel, blower means, and nozzle means connected to said blower means for repeatedly subjecting each of the pans in its passage through said tunnel to blasts of air from said blower means for a period of time sufficient to progressively dry and simultaneously cool said pans, the blown air being of [a] *substantially room* temperature [substantially less than the temperature of the wetted and heated pans, so that], the pans [are] being cooled to a final temperature less than the temperature of the blown air.

16. In a machine for processing substantially flat bakery pans of substantially uniform dimensions to rinse, dry and cool them, and including an elongated frame having a load end and a discharge end, an endless conveyor mounted in said frame and including means for supporting the bakery pans in uniform longitudinally spaced relation in near vertical posture and inclined with respect to the vertical, means for driving said conveyor and said pans thereon from the load end of the machine to the discharge end thereof, means for processing said pans including means for hot water rinsing said pans, said hot water rinsing means including a rinse tank underlying said conveyor, a tunnel overlying said conveyor and said rinse tank, conduit and spray means for delivering rinse water to discharge on the pans, the improvement comprising the combination with said means for hot water rinsing said pans, as the next means for said processing of said pans, of a dry and cool section, said dry and cool section surrounding said conveyor at the discharge end of said machine and comprising a closure underlying and overlying said conveyor, air nozzle means disposed in longitudinal spaced relation within said closure for progressively delivering air to discharge on the pans as they travel through said section, blower means for forcing air [at ambient temperature] through said air nozzle means *at substantially ambient temperature* for blowing off and evaporating water remaining on said pans from said hot water rising means, said section extending to the discharge end of said machine through a distance sufficient to permit said blown air to simultaneously dry and evaporatively cool the pans during their travel through said section, *to a resultant temperature sufficiently low so that when pan grease is subsequently applied to the pans it will adhere to the pan surfaces.*

17. In a machine for processing substantially flat bakery pans of substantially uniform dimensions to rinse, dry and cool them, and including an elongated frame having a load end and a discharge end, an endless conveyor mounted in said frame and including means for supporting the bakery pans in uniform longitudinally spaced relation in near vertical posture and inclined with respect to the vertical, means for driving said conveyor and said pans thereon from the load end of the machine to the discharge end thereof, means for processing said pans including means for hot water rinsing said pans, said hot water rinsing means including a rinse tank underlying said conveyor, a tunnnel overlying said conveyor and said rinse tank, conduit and spray means for delivering rinse water to discharge on the pans, the improvement comprising the combination with said means for hot water rinsing said pans, as the next means for said processing of said pans, of a dry and cool section, hot water booster means in said hot water rinsing means at the discharge end thereof for raising the temperature of the rinse water at said discharge end to nearly the boiling point, conduit and manifold spray means for delivering the heated water to discharge on the pans at the discharge end of said hot water rinsing means, said rinse water when heated by the booster means raising the temperature of the pans above 180° F., said dry and cool section surrounding said conveyor at the discharge end of said machine and comprising a closure underlying and overlying said conveyor, air nozzle means disposed in longitudinal spaced relation within said closure for progressively delivering air to discharge on the pans as they travel through said section, blower means for forcing air [at ambient temperature] through said air nozzle means *at substantially ambient temperature* at sufficient force *and volume* for blowing off and evaporating water remaining *on said pans* from said hot water rinsing means, said section and the air nozzle means therein extending to the discharge end of said machine through a distance sufficient to permit said blown air to simultaneously dry and evaporatively cool the pans *to a resultant temperature sufficiently low so that when pan grease is subsequently applied to the pans it will adhere to the pan surfaces.*

References Cited in the file of this patent or the original patent

UNITED STATES PATENTS

| | | |
|---|---|---|
| 864,132 | Hood | Aug. 20, 1907 |
| 1,720,622 | Breton | July 5, 1929 |
| 2,644,473 | Fox | July 7, 1953 |
| 2,698,627 | Kearney | Jan. 4, 1955 |

FOREIGN PATENTS

| | | |
|---|---|---|
| 262,228 | Switzerland | June 30, 1949 |